Jan. 11, 1966  F. A. REIFENHAUSER  3,229,005
METHOD AND APPARATUS FOR FORMING ELONGATED MEMBERS
Filed Sept. 25, 1963                              5 Sheets-Sheet 1
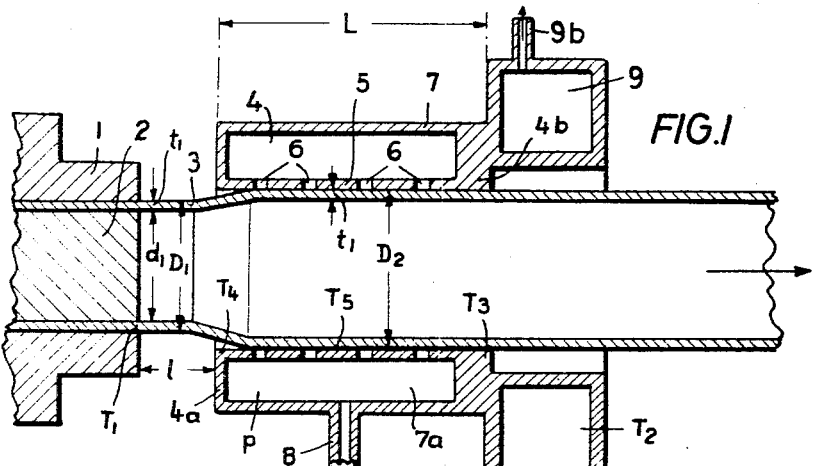
FIG.1
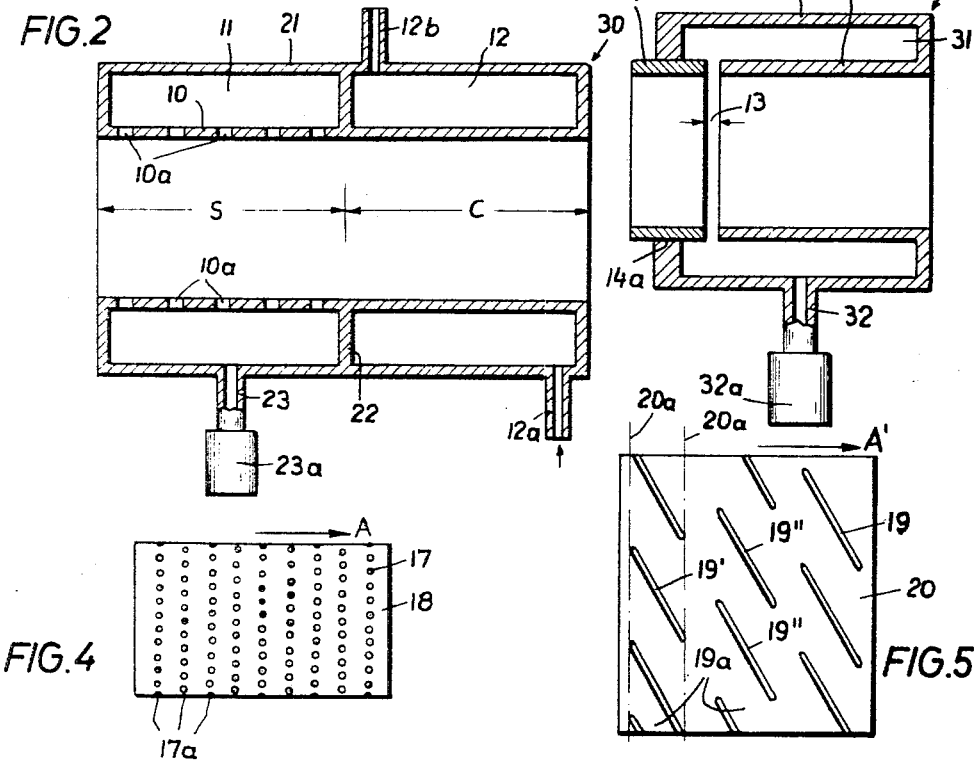
INVENTOR.
Friedrich Aloisius Reifenhäuser
BY
Michael S. Striker
agt.

Jan. 11, 1966     F. A. REIFENHAUSER     3,229,005
METHOD AND APPARATUS FOR FORMING ELONGATED MEMBERS
Filed Sept. 25, 1963            5 Sheets-Sheet 2
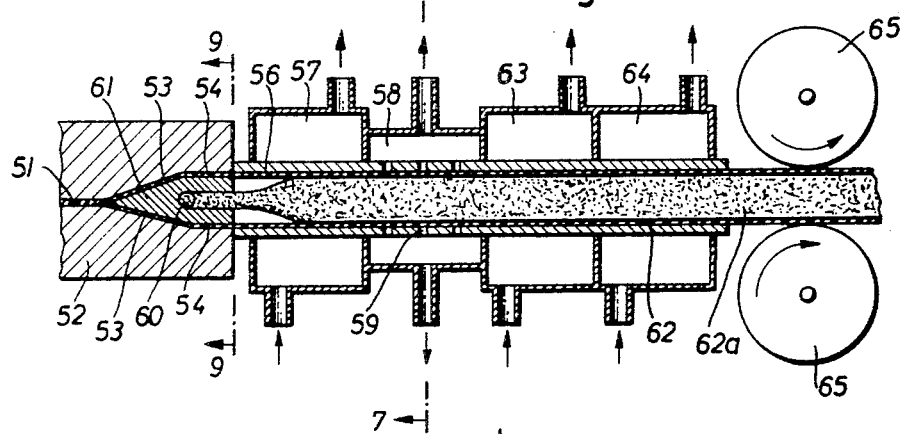
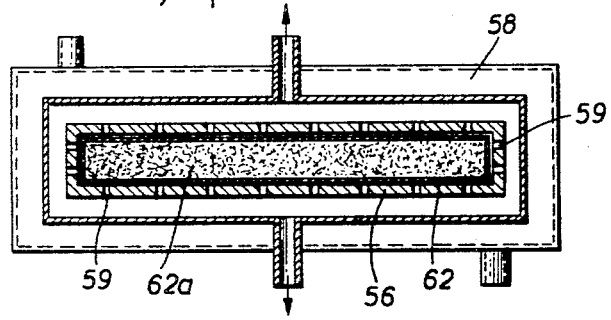
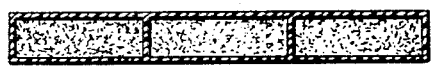
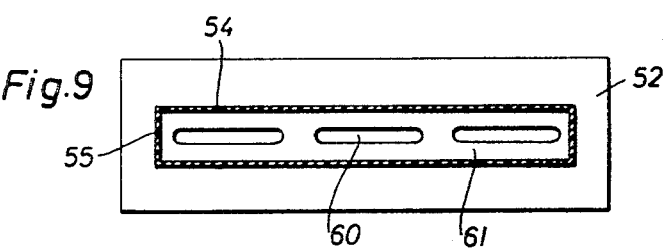

Jan. 11, 1966  F. A. REIFENHAUSER  3,229,005
METHOD AND APPARATUS FOR FORMING ELONGATED MEMBERS
Filed Sept. 25, 1963  5 Sheets-Sheet 4
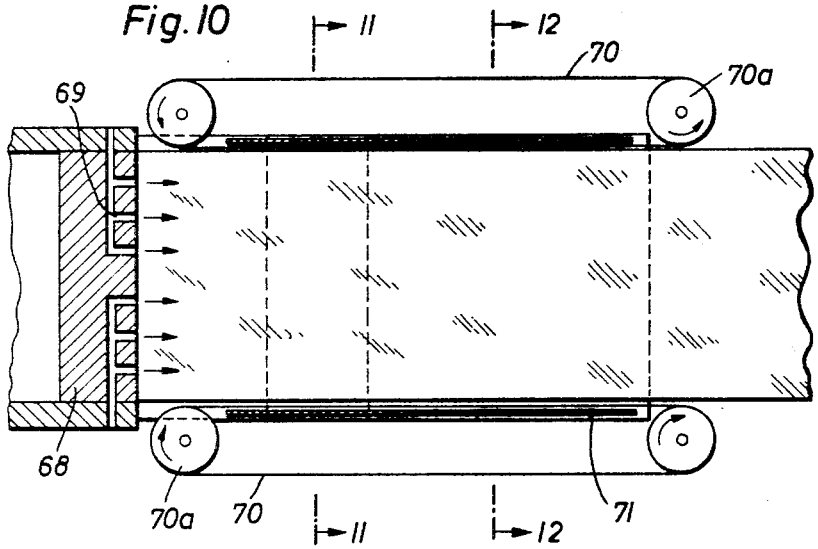
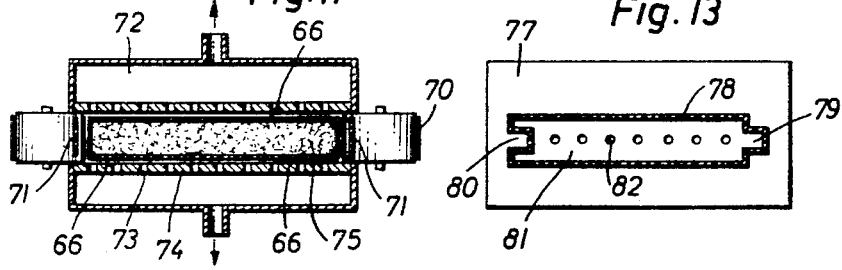
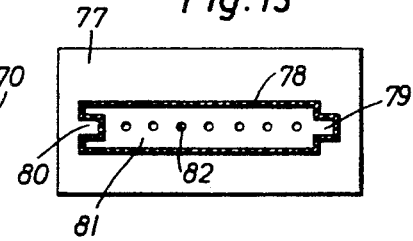
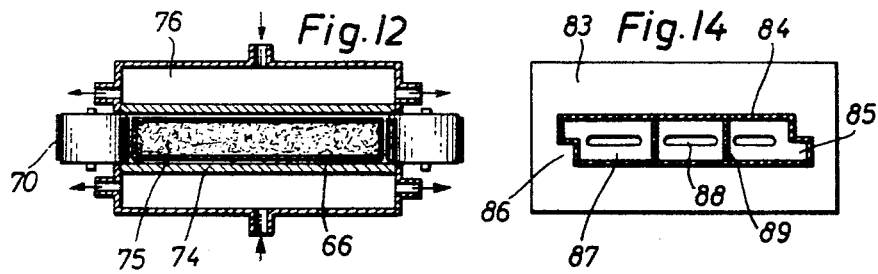
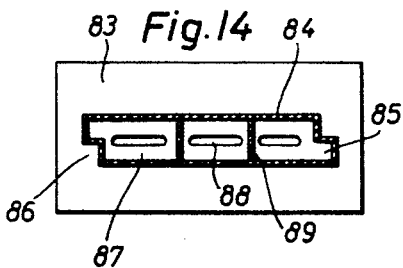
INVENTOR
Friedrich Alois
BY Reifenhäuser
Michael S. Striker
Attorney Jan. 11, 1966  F. A. REIFENHAUSER  3,229,005
METHOD AND APPARATUS FOR FORMING ELONGATED MEMBERS
Filed Sept. 25, 1963  5 Sheets-Sheet 5

INVENTOR
Friedrich Aloisius
Reifenhäuser
BY
Michael S. Striker,
Attorney

United States Patent Office 3,229,005
Patented Jan. 11, 1966

3,229,005
METHOD AND APPARATUS FOR FORMING
ELONGATED MEMBERS
Friedrich Aloisius Reifenhauser, 45 Altenrather Strasse,
Troisdorf, Bezirk Cologne, Germany
Filed Sept. 25, 1963, Ser. No. 313,720
Claims priority, application Germany, July 15, 1954,
R 14,629
15 Claims. (Cl. 264—47)

This application is a continuing application of my copending application Serial No. 56,087 filed September 8, 1960, which was in turn a continuation-in-part of a copending application Serial No. 521,836, filed July 13, 1955, and entitled, Method and Apparatus for Shaping Tubing and the Like, both of which applications are now abandoned.

The present invention relates to an extruding process and apparatus for forming elongated plastic tubes which have a predetermined cross-sectional configuration and which may or may not be filled with a suitable filler material.

There exist continuous casting or extrusion molding apparatus which are adapted to produce tubing or other tubular workpieces of thermoplastic material. Such apparatus often include an arrangement wherein an extruder screw moves a thermoplastic material through a die or nozzle so as to continuously form tubing or the like.

It has been found, however, that known apparatus will normally deliver tubing, particularly tubing of thermoplastic material, at a temperature at which the thermoplastic material is deformable. As a result, the thus delivered tubing will not retain the shape imparted to it by the die or nozzle.

Several attempts have been made properly to cool the tubing so that it will retain the shape imparted to it by the die or nozzle but it has been found that in practice it is not feasible to bring about such a result.

The present invention overcomes the disadvantages of the prior apparatus and method. In accordance with one aspect of the invention there is provided an improvement in an apparatus for sizing a tubular thermoplastic workpiece previously heated to a plastic deformation temperature. This apparatus comprises a sizing member including an open-ended passage with an internal sizing surface having a substantially uniform cross-sectional shape throughout its length which shape corresponds to a desired outer shape of the workpiece. There is also included means for holding the heated workpiece against the sizing surface as the workpiece is moved through the passage and means for cooling the workpiece to a substantially non-deformable condition after the sizing thereof. The improvement to the above apparatus involves providing the holding means as conduit means communicated with the sizing surface, the conduit means being located around the periphery of the passage between the entrance and exit ends thereof, and means for creating a vacuum in the conduit means whereby atmospheric air pressure within the workpiece forces the workpiece against the sizing surface and holds the workpiece against the surface as the workpiece moves continuously through the passage. The conduit means includes a plurality of small, closely spaced passages arranged around the periphery of the passage and forming a substantially continuous vacuum orifice around the periphery thereof.

It is therefore one of the objects of the present invention to provide a method and apparatus for shaping tubing and the like by means of which the tubing will permanently retain a particular shape imparted to it.

It is another object of the present invention to provide a method and apparatus for treating a freshly cast or extruded thermoplastic workpiece or the like in such a manner that this workpiece will have a permanent shape imparted to it.

The objects of the present invention also include the provision of a method and apparatus for treating tubing and the like wherein such tubing is shaped while in a deformable state and it is thereafter placed in a non-deformable state so that it will retain the shape imparted to it.

It is a further object of the present invention to provide a process and apparatus according to which there is extruded simultaneously with an elongated tube of plastic a filler material which fills the tube of plastic.

Also with the above objects in view, there is provided, in accordance with the present invention, in an extruder, an exterior die and an interior mandrel surrounded by the die and defining therewith an endless outlet through which the work material flows to form a tube, this die being formed in its interior in advance of the outlet with a main passage through which the work material flows to the outlet. A branch passage means is located in the die between and communicating with the main passage and the outlet and providing at least two subsidiary passages diverging from the main passage to direct the material from the main passage to the outlet without sharply changing the direction of material flow.

Also in accordance with the present invention there is provided a process which includes the steps of extruding a tube of plastic and simultaneously introducing into the tube of plastic, while it is being extruded, a foamable, synthetic, thermoplastic, resin-forming composition which forms an insulating filler material in the interior of the tube of plastic simultaneously with the movement of the latter from the extruder.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, which:

FIGURE 1 is a fragmentary diagrammatic sectional view of one embodiment of a structure according to the present invention;

FIGURE 1 is a sectional illustration of another embodiment of the present invention;

FIGURE 3 is a sectional view of a part of yet another structure according to the present invention;

FIGURE 4 is a geometric development illustrating a part of the structure of the invention;

FIGURE 5 is also a geometric development illustrating a component of the invention.

FIGURE 6 is a diagrammatic, sectional side elevation of a further process and apparatus according to the present invention;

FIGURE 7 is a transverse section taken along line 7—7 of FIGURE 6 in the direction of the arrows;

FIGURE 8 is a transverse section of one possible extruded article capable of being formed with the process and apparatus of the present invention;

FIGURE 9 is a view of an extruder nozzle of the invention as seen when looking toward the discharge end thereof;

FIGURE 10 is a diagrammatic, partly sectional plan view of yet another process and apparatus according to the present invention;

FIGURE 11 is a transverse section of the structure of FIGURE 10 taken along line 11—11 of FIGURE 10 in the direction of the arrows;

FIGURE 12 is a transverse section of the structure of FIGURE 10 taken along line 12—12 of FIGURE 10 in the direction of the arrows;

FIGURE 13 is an end view of another extruder nozzle according to the invention as seen when looking at the discharge end face thereof; and FIGURE 14 is an illustration of yet another extruder nozzle according to the invention as seen when looking toward the discharge end face thereof.

Figure 6A:
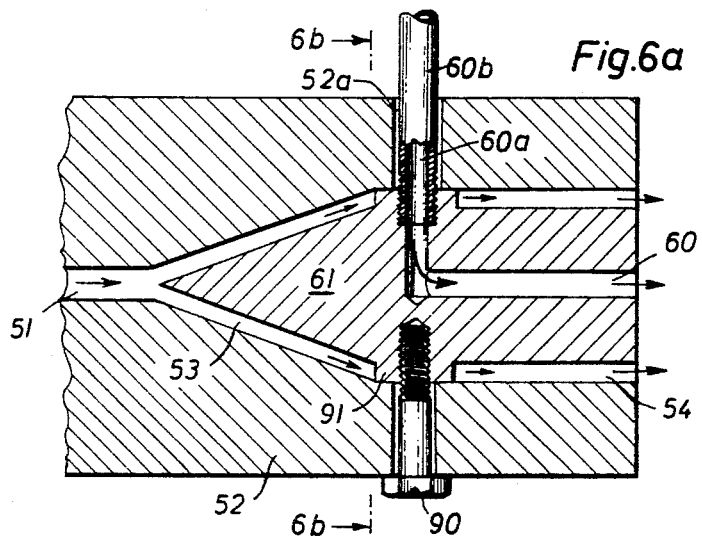
FIGURE 6a is an enlarged illustration of that part of the structure of FIGURE 6 which is shown at the left end of FIGURE 6.

Referring now to the drawings and to FIGURE 1 in particular, there is shown a nozzle 1 and mandrel 2 arrangement of an extruding means for continuously extruding, i.e., forming and moving hollow tubing 3 rightwardly, as viewed in FIGURE 1. The extruding means may be any known casting or extrusion device capable of producing tubing or the like of thermoplastic material, such as screw extrusion presses, it being understood that the term "tubing" 'or "tubular workpiece" as referred to throughout the specification and claims is deemed to include any elongated hollow element irrespective of its cross-section configuration.

The casting or extrusion device yields tubing of thermoplastic material while the latter is at a temperature at which the thermoplastic material is deformable.

A tubular shaping member 4 having an inlet portion 4a and an outlet portion 4b is in axial alignment with the nozzle 1 and is so positioned relative thereto that the tubing 3 will be moved through the tubular member 4 by the extruding means. The inlet portion 4a is spaced a distance *l* from the end of the nozzle 1, which distance *l* may be between several millimeters and several centimeters, so that the tubing 3 is introduced into the tubular member 4 while the tubing 3 is still deformable.

The tubular shaping member 4 is composed of an inner wall portion 5 and an outer wall portion 7, which wall portions define an annular space 7a between themselves. The inner diameter of the inner wall portion 5 is somewhat greater than the inner diameter of the nozzle 1 and consequently greater than the outer diameter of the tubing 3 which is being introduced into the tubular member 4. The inner wall 5 is formed with a plurality of opening means 6 therethrough which place the interior of the tubular member 4 in communication with the annular space 7a formed between the wall portions 5 and 7. The outer wall portion 7 is formed with a conduit stud 8 which is adapted to be connected to a source of vacuum 8a.

When a vacuum is created in the annular space 7a the side wall of the deformable tubing 3 will be sucked against the inside of the inner wall portion 5 so that this tubing 3 will adopt a shape which corresponds to the cross-sectional configuration of the inner cross-sectional configuration of the wall portion 5.

Suitable cooling means 9 are provided at the outlet end 4b of the tubular member 4. The cooling means include an annular chamber provided with suitable coolant inlet and outlet means 9a and 9b and are in heat-exchange relationship with the tubular member 4, which member is made of a heat-conducting material. In the illustrated embodiment, the cooling means 9 are formed integrally with the tubular member 4.

The cooling means 9 serve to cool the tubular member 4, and lower the temperature of the inner wall portion 5 sufficiently so that when the tubing 3 contacts this inner wall portion 5, the tubing will be cooled to a temperature at which the thermoplastic material hardens, thereby hardening the tubing so that the same will retain a shape corresponding to the internal cross-sectional configuration of the wall portion 5.

By virtue of the fact that the cooling means 9 is located in the region of the outlet end 4b of the tubular member 4, the temperature of any one portion of the tubular member 4 located in a predetermined plane normal to the axis of the tubular member and between the inlet and outlet ends will be lower than the temperature at another portion of the tubular member located in another plane normal to the axis of the tubular member and nearer to the inlet end 4a than the one portion. In this way, the tubing 3 may be hardened to some extent in the region of the inlet end 4a but will be further hardened as it moved rightwardly through the tubular member 4 toward the outlet end 4b.

If desired, the heat-conducting capacity of the inner wall portion 5 may be increased by increasing its thickness or by making it of a material which has greater heat-conducting ability, i.e., a lower specific heat, than the material of which the remainder of the tubular member 4 is made. Moreover, additional cooling means may be provided in the region of the inlet end 4a, or additional coolant-containing chambers may encompass the outer wall portion 7, it being clear that each coolant-containing chamber may be independent from the other chambers or that all of the chambers may be in communication with each other so that a common coolant may be circulated therethrough.

If desired, the tubular member may be provided with tubular cooling means connected to the tubular member at the outlet end thereof, which cooling means are adapted actually to contact the tubing after it has passed through the tubular shaping member proper.

In the embodiment illustrated in FIG. 2, a tubular combined shaping and cooling member 30 is shown as being divided into a shaping portion S and a cooling portion C. The tubular member 30 is formed with an inner wall portion 10 and an outer wall portion 21 which define an annular space between themselves. An annular partition 22 divides the annular space into two annular chambers 11 and 12 which correspond to the shaping portion S and the cooling portion C, respectively.

The inner wall portion 10 is formed, in the region of the shaping portion, with a plurality of openings 10a and the outer wall portion is formed, in the same region, with a conduit stud 23 which places the annular chamber 11 into communication with a source of vacuum 23a.

The outer wall portion 21 is formed, in the region of the cooling portion, with coolant inlet and outlet means 12a and 12b.

When a tubular workpiece moves rightwardly through the tubular member 30, the workpiece will, as it passes through the shaping portion S, be sucked against the inner wall portion 10 so as to assume a shape corresponding to the inner cross-section configuration of the inner wall portion 10. When the workpiece continues to move rightwardly out of the shaping portion S and through the cooling portion C, the workpiece will be subjected to the direct cooling effect of the coolant circulating in the annular chamber 12. In this way the tubing or other workpiece will be shaped and initially cooled and hardened as it moves through the shaping portion S and will, as it moves through the cooling portion C, be further cooled and thereby further hardened.

It is clear from the above that a tubular shaping member and cooling means therefor according to the present invention may advantageously be used in conjunction with any device capable of yielding tubes or tubing of thermoplastic material at a temperature at which the material is deformable but nevertheless having a sufficient wall thickness and stiffness to prevent crumpling. Such device need not be an extrusion press or the like for initially forming the tubing, but may consist of a heater arrangement for raising the temperature of already formed tubing of thermoplastic material to a deformable temperature.

FIG. 3 shows a tubular shaping members 40 which is composed of two axially spaced inner tube sections 14 and 15 and an outer wall portion 16, an annular chamber 31 being formed between these elements. The outer wall portion 16 is formed with a conduit stud 32 which places the annular chamber 31 in communication with a source of vacuum 32a.

The inner tube sections 14 and 15 are axially spaced from each other and form an annular slot 13 between themselves, which slot constitutes the opening means placing the inside of the tubular shaping member in communication with annular chamber 31.

As is shown in FIG. 3, the inner tube section 15 is integral with the outer wall portion 16. The inner tube section 14, however, may be mounted for axial movement relative to the inner tube section 15 so that the axial length of the annular slot 13 may be varied. If the inner tube sections 14 and 15 are circular ones, the inner tube section 14 may be provided with an external thread in engagement with an internal thread which may be provided at 14a. If the cross-sectional configuration of the tube sections 14 and 15 is a non-circular one, other means may be provided for mounting the inner tube section 14 for axial movement relative to the inner tube section 15, such as a rack and pinion arrangement.

FIG. 4 is a geometric development of a preferred embodiment of a tubular shaping member showing opening means extending through the member for placing its interior in communication with its exterior, the axis of the member being indicated by the arrow A. The inner wall portion of the shaping member is indicated at 18 and a plurality of radial apertures extending through the shaping member are shown at 17. A plurality of groups 17a of apertures are provided, the apertures of each group having axes lying in a common plane normal to the axis of the tubular shaping member, and the planes of the respective groups of the plurality of groups are axially spaced from each other. The apertures of adjacent groups are angularly displaced relative to each other so that the apertures of such adjacent groups are out of axial alignment with each other, as may readily be seen in FIG. 4. By virtue of such an arrangement, the formation of longitudinal stripes or striations in the tubing being shaped is prevented.

A tubular shaping member incorporating an aperture arrangement similar to the one illustrated in FIG. 4 may advantageously be used for shaping tubing having an outside diameter of 20 mm. Such a shaping member may be constituted by a brass tube having an inner diameter of 20 mm. and an axial length of 35 mm. The shaping member is provided with six groups of apertures, each group containing apertures of not more than 0.7 mm. in diameter and spaced approximately 2 mm. from each other. It has been found that with the diameter of the apertures of not more than 0.7 mm. the formation of striations in the finished product is prevented.

FIG. 5 is a geometric development of another preferred embodiment of a tubular shaping member showing a different arrangement of opening means, the axis of the member being shown by the arrow A'. The inner wall portion of the shaping member is indicated at 20 and a plurality of helical slots extending through the shaping member are shown at 19. A plurality of groups 19a of helical slots are provided, the slots of each group extending between a pair of spaced planes 20a normal to the axis of the tubular shaping member. As is clearly shown in FIG. 5, the slots of adjacent groups are out of axial alignment with each other, and the configuration of the slots is such that any one slot 19' will axially overlap two adjacent slots 19'' of an adjacent group. In this way the formation of striations in the finished product is prevented.

The above-described apparatus may advantageously be used to carry out a method of continuously forming and shaping tubing of thermoplastic material, which method is also within the scope of the present invention and comprises the steps of continuously forming and delivering tubing or the like of thermoplastic material in a deformable state, applying a vacuum to the outer surface of the thus delivered tubing to expand the same and simultaneously limiting the extent of expansion thereof, and of cooling the thus expanded tubing to a temperature below the softening point of the thermoplastic so that the tubing retains the shape imparted thereto during the first-mentioned step. The tubing may be of any suitable thermoplastic material, as, for example, polyvinyl chloride with or without softener, polyethylene, polyamide, polystyrol, polymethacrylate, polyfluorethylene or the like. The exact shape of such tubing may be controlled within very close tolerances, and the product will possess excellent surface properties.

The following example is given further to illustrate the above-described method, the scope of the invention however not being limited to the specific details of the example.

The method according to the present invention may be carried out by the apparatus illustrated in FIG. 1. The extrusion device incorporating the nozzle and mandrel 1, 2 delivers tubing of polyethylene at a rate of 33.33 mm./sec. The tubing has an inner diameter $d_1$ of 20 mm., an outer diameter $D_1$ of 25 mm., and consequently a thickness of $t_1$ of 2.5 mm. The extrusion device delivers the tubing at a temperature $T_1$ of approximately 130° C. which is above the temperature of 80° C. at which the material just starts to become deformable so that the tubing is deformable.

The tubular shaping member 4 has an axial length L of 50 mm., an inner diameter $D_2$ of 25 mm., and is spaced a distance of $l$ of 40 mm. from the nozzle and mandrel 2. The source of vacuum 8a creates a vacuum P of approximately 0.2 kg./cm.² in the chamber 7a so that the tubing will be sucked against the inner side of the shaping member 4 and will adopt an outside diameter equal to the inside diameter $D_2$ of the tubular shaping member 4, the thickness $t_1$ remaining constant.

The temperature $T_2$ of the coolant circulating in the cooling means 9 is approximately 10° C., and the temperature $T_3$ of the tubular shaping member 4 at its outlet and 4b is approximately 25° C. and at its inlet end 4a is approximately 40° C., the temperature $T_5$ at an intermediate point of the member 4 being approximately 40° C., so that it will be seen that after treatment the tubing will have hardened by being cooled to a temperature below the temperature of 80° C.

Referring now to FIG. 6, there is shown at the left end thereof an extruder nozzle according to the invention, this nozzle having an exterior die 52 and an interior mandrel 61 which is surrounded by the die 52 and which defines therewith at the end face of the nozzle (shown in FIG. 9) an endless outlet which in the illustrated example is rectangular and includes a pair of elongated parallel upper and lower portions 54 and a pair of relatively short opposed parallel vertical portions 55. The die 52 is formed in its interior in advance of the outlet 54, 55 with an elongated main passage 51 through which the work material flows toward the outlet 54, 55. The nozzle of the invention includes between the main passage 51 and the outlet 54, 55 a branch passage means which provides the pair of passages 53 which communicate with the main passage 51 and diverge from the latter toward the outlet 54, 55, as indicated in FIG. 6, so that in this way the pair of subsidiary passages 53 direct the material from the main passage 51 to the outlet 54, 55 without sharply changing the direction of material flow.

The work material which issues to the right from the endless outlet 54, 55 forms an elongated plastic tube 62 which continuously advances to the right, as viewed in FIG. 6, and in accordance with a further feature of the invention there is located within this plastic tube 62 a filler material 62a described below, this filler material 62a reaching the interior of the tube 62 simultaneously with the extrusion of the latter by way of an additional passage 60 formed in the mandrel as well as the die and having at least one outlet or discharge end surrounded by the endless outlet 54, 55. Thus, FIG. 9 shows a central outlet 60 for the additonal passage through which the filler material 62a issues, and a pair of lateral outlets located beside the central outlet and also serving to supply the filler material 62a.

Figure 6B:
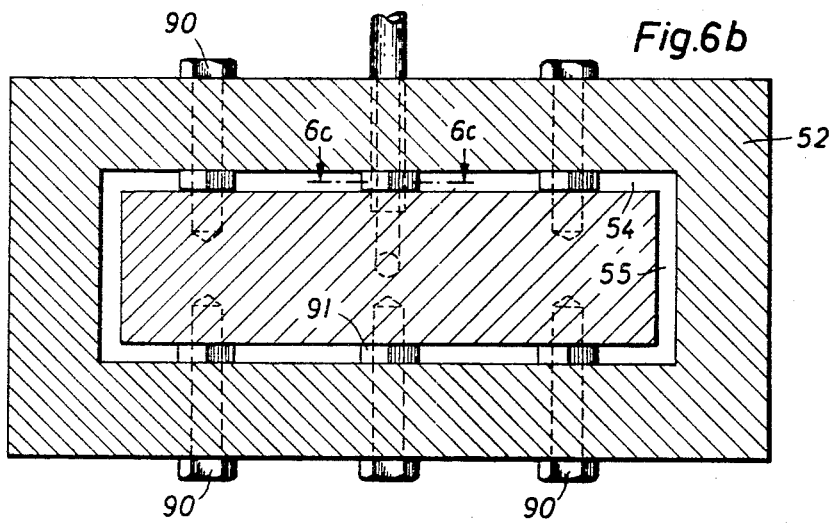
FIGURE 6b is a transverse section taken along line 6b—6b of FIGURE 6a in the direction of the arrows.
Figure 6C:
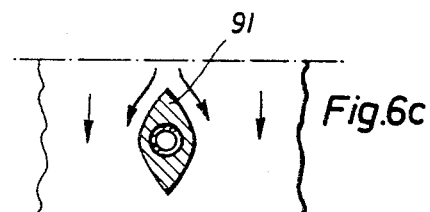
FIGURE 6c is a fragmentary sectional plan view taken along line 6c—6c of FIGURE 6b in the direction of the arrows.

The construction of the nozzle of the invention is shown in greater detail in FIGS. 6a–6c.

The mandrel 61 has a substantially rectangular portion which cooperates with the rectangular opening in the die 52 at the right portion thereof as viewed in FIG. 6a to define the rectangular outlet. The branch passage means is formed by a rear portion of the mandrel 61 which is of pyramidal configuration and which is located with clearance in an interior portion of the die 52 which is of corresponding pyramidal configuration, so that in this way the branch passages or subsidiary passages 53 are formed.

The mandrel 61 is fixed to the die 52 by the screw members 90 which extend through openings of the die 52 into threaded bores formed in the mandrel 61. These screws or bolts 90 are distributed across the die 52 in the manner shown in FIG. 6b. As is shown in FIG. 6b, in the illustrated example there are three such bolts or screws 90 located along the lower portion of the die 52 and a pair of the screws 90 are located along the upper portion of the die 52.

The mandrel 61 is provided with bosses 91 which directly engage the inner surface of the die 52 so as to hold the exterior surface of the mandrel properly spaced from the interior surface of the die. As is apparent from FIGS. 6a and 6b, the bores which receive the bolts 90 extend through these bosses. Moreover, as is clearly apparent from FIG. 6c, the bosses 91 have a streamlined configuration in the direction of flow of the material from the main passage 51 through the branch passages 53 to the outlet 54, 55, and thus these bosses 91 provide a minimum amount of resistance to the flow of the work material toward the outlet 54, 55.

The filler material 62a, which, after it is introduced into the interior of the plastic tube 62, foams so as to expand and fill the interior of the tube, is introduced through the separate outlets 60, as pointed out in connection with FIG. 9 above, and FIG. 6a shows one of these outlets 60 communicating with a vertical bore 60a. The die 52 is formed with a bore 52a through which a tube 60b passes, the material which forms the filler 62a flowing through the tube 60b and along the bore 60a to the outlet 60. The bore 52a is in alignment with one of the bosses 91, and the tube 60b is threaded at its lower end into an upper threaded portion of the mandrel 61, this threaded portion being coaxial with and forming part of the bore 60a which communicates with the bore 60. Although only one bore for the filler material is indicated in FIG. 6b, it should be understood that any desired number of these passages for the filler material may be provided, and of course three such passages are indicated in FIG. 9.

Returning now to FIG. 6, there is indicated therein an elongated shaping tube 56 having in its interior a rectangular configuration corresponding to that of the outlet 54, 55 so that the still deformable plastic material issuing from the outlet will be hardened as it moves along the inner surface of the shaping tube 56 and thus when the plastic tube 62 moves beyond the right end of the tube 56 the material of the plastic tube is completely set and will retain its shape. The portion of the shaping tube 56 which is closest to the extruder nozzle is surrounded by a container 57 formed with suitable inlets and outlets through which cooling fluid may enter into and leave the container 57 so that the material moving along the interior of the shaping tube 56 is cooled in the region where the shaping tube 56 is surrounded by the container 57. FIG. 6 indicates with arrows how a cooling medium such as cool water may be introduced to and removed from the container 57.

A container 58 surrounds the tube 56 at the portion thereof which immediately follows the container 57, and this container 58 has suitable fittings which serve to connect the interior of the container 58 with a source of vacuum. As is clearly apparent from FIGS. 6 and 7, the wall portion of the shaping tube 56 which is surrounded by the container 58 is formed with a plurality of apertures 59 so that in this way the interior of the shaping tube 56 will be placed in communication with the source of vacuum connected with the interior of the container 58, and thus the tube 62 while still deformable will be maintained against the inner surface of the shaping tube 56 which will of course determine the final configuration of the tube 62.

It will be noted from FIG. 6 that the foaming of the filler material 62a does not commence until after this material has moved beyond the extruder nozzle and by the time the filler material reaches the area where the tube 56 is surrounded by the vacuum chamber 58 the filler material will have foamed sufficiently so as to press against the plastic tube 62 and thus contribute in this way to the maintaining of the plastic tube 62 against the inner surface of the accurately machined tube 56 which will accurately determine the shape of the hardened tube 62.

Beyond the vacuum chamber 58 the structure includes a pair of successive cooling chambers 62 and 64 identical with the cooling chamber 57 and through which the cooling fluid circulates in the same way. It should be noted that even after the vacuum chamber 58 the filter material will guarantee that the plastic tube 62 will remain in slidable engagement with the inner surface of the shaping tube 56. By the time the extruded tube and filler material 62a have reached the right end of the shaping tube 56 both the tube 62 and the filler 62a are completely set and the rolls 65 serve to convey the material to a desired location where it may be cut into any suitable lengths, additional rolls 65 being provided for this purpose. Only a part of the rolls 65 is illustrated in FIG. 6.

Some of the possible variations which can be made with the arrangement of FIGS. 6, 7 and 9 are illutsrated in FIGS. 13 and 14. Thus, referring to FIG. 13, it will be esen that the die 77 illustrated therein surrounds a mandrel 81, the elements 77 and 81 being of the same general construction as the elements 52 and 61. The die 77 and mandrel 81 define between themselves an outlet passage 78 which is endless and which has the configuration clearly shown in FIG. 13. Thus, the die 77 is provided at the left side of the outlet 78 with a projection 80 extending into a corresponding recess of the mandrel 81, while the mandrel 81 has at the right side of FIG. 13 a projection 79 identical with the projection 80 and extending into a corresponding recess of the die 77. The mandrel 81 is provided with outlets 82 for the filter material as described above. Thus, with the structure of FIG. 13 there will be produced an elongated tube of plastic filled with a suitable filler material and having complementary configurations at its opposite side edges. When the elongated filled plastic tube is cut into suitable lengths, these lengths will have a tongue and groove construction and can be placed in side by side relation with the tongue of one elongated member extending into the groove of the next, so that in this way with the structure of FIG. 13 it is possible to provide elongated members which will fit together due to their complementary side edges.

With the arrangement shown in FIG. 14, the die 83 surrounds a mandrel 87 to define with the latter the outlet passage 84 which also has complementary side edge portions. It will be noted that in this embodiment the die 83 is stepped as shown at 86 while the mandrel 87 has a corresponding configuration at its left side, as viewed in FIG. 14, while the mandrel 87 is provided at its right side with a lower projection 85 forming a stepped construction which is complementary to that on the left side of the nozzle, and of course the die 83 has a corresponding configuration. Thus, with these profiled side edges it is possible to provide elongated members which will also fit together, so that it is clear that the profiled side edges are not limited to the tongue and groove type of construction shown in FIG. 13. Of course, if desired, the profiled side edges may provide a dovetail tongue and groove construction.

Also in FIG. 14 it will be noted that the outlet 84 is provided with a pair of additional outlet portions 89 extending between the elongated upper and lower parallel portions of the outlet 84 so that with this construction the interior of the plastic tube will have longitudinally extending partitions. The mandrel 87 is in addition provided with the outlets 88 for the filler material. Thus, in the case where the sides of the die 83 and the mandrel 87 which form the outlet 84 are simply vertical so as to define a rectangular outlet 84, an article will be produced having the construction shown in FIG. 8. These partitions formed by the outlet portions 89 serve to greatly strengthen the filled plastic tube and provide it with considerable resistance against bending.

Of course, instead of partitions extending from the top to the bottom of the tube, it is possible to provide outlet portions similar to the outlet portions 89 of FIG. 14 but extending only part way across the space between the upper and lower parallel elongated portions of the outlet 84, so that with this arrangement the plastic tube will be provided in its interior with longitudinally extending reinforcing ribs. In addition, the die 83 may be formed along the upper and lower portions of the outlet 84 with additional outlet portions extending perpendicularly away from the interior of the tube so as to form the tube with exterior longitudinal ribs. All of these variations are within the scope of the invention and can be made without any difficulty.

Figure 11A:
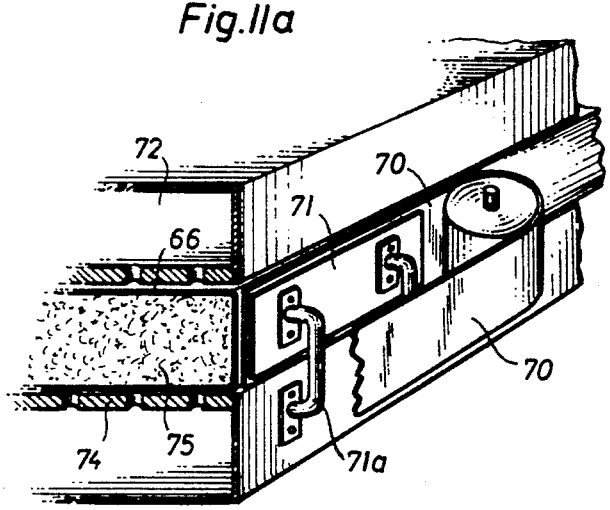
FIGURE 11a is a fragmentary perspective illustration of part of the structure of FIGURE 11.
Figure 11B:
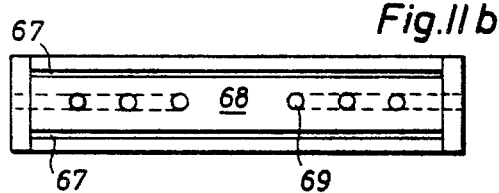
FIGURE 11b is an end view of the nozzle of FIGURE 10 as seen at the right end face of this nozzle of FIGURE 10.

According to the embodiment of the invention which is illustrated in FIGS. 10–12, the side surfaces of the mandrel 68 are in engagement with the side surfaces of the hollow interior of the die which receives the mandrel 68, so that with this construction there is provided only a pair of upper and lower horizontally extending outlet passages 67 illustrated in FIG. 11b, and thus with this construction the extruding nozzle will provide only a pair of flat bands of plastic which continuously issue from the nozzle toward the right, as viewed in FIG. 10. As is apparent from FIGS. 10 and 11b, the nozzle is formed with the passages 69 providing outlets for the foam filler which is in this way introduced before foaming into the space between the pair of plastic bands issuing from the outlets 67. Thus, the pair of plastic bands issuing from the outlets 67 and the filler material therebetween will move continuously along the path indicated in FIG. 10 from the left toward the right. In accordance with the invention there is located along this path on opposite sides thereof, respectively, a pair of guide bands which are located adjacent to and extend between the side edges of the plastic bands issuing from the nozzle 67, so that these guide bands and the plastic bands cooperate to form limits to the expansion of the filler material, and thus until the filler and the bands themselves become completely set the filler material is confined and will assume a configuration conforming to that of the guide bands and plastic bands.

These guide bands are in the form of a pair of endless bands 70 arranged as indicated in FIG. 10, and the pair of runs of the endless bands 70 which are directed toward each other form the guide bands which limit the lateral expansion of the filler material. Inasmuch as these guide bands are located directly next to the side edges of the plastic bands the result will be an elongated article having upper and lower sheets of plastic with filler located therebetween and exposed at the sides.

Thus, referring to FIG. 11, the plastic bands 66 are shown therein in cross-section with the filler material 75 therebetween, and FIG. 11 clearly shows how the inner runs of the endless bands 70 are located next to the edges of the plastic bands 66 to form with the latter limits on the expansion of the filler material 75 so as to determine the configuration of the latter while it sets. The endless bands 70 are carried by pulleys 70a which are driven from any suitable drive in the directions indicated in FIG. 10, so that these endless bands 70 move together with the filler and plastic bands from the left toward the right, as viewed in FIG. 10. The endless bands 70 may be made of a metal such as steel which is advantageously covered with a plastic coating of, for example, tetrafluoroethylene or any other suitable thermoplastic. Of course, it is also possible to use woven endless bands made of a material which resists stretching and which is also covered with a suitable plastic so that there will be no clinging of the work material to the guide bands.

As is shown in FIG. 11, a pair of vacuum chambers 72 are located above and below the plastic bands 66 and connected with any suitable source of vacuum, these vacuum chambers engaging the plastic bands very shortly after they issue from the outlets 67. The walls 74 of the vacuum chambers 72, these walls 74 directly engaging the plastic bands 66, are formed with apertures 73, so that in this way the plastic bands are held directly against the walls 74 while sliding therealong, and thus the vacuum chambers 72 guarantee that the plastic bands 66 will be maintained at the desired distance from each other and parallel to each other, the walls 74 being fixedly held in position through any suitable brackets or the like. Thus, during the time that the plastic bands 66 are still somewhat deformable they are maintained against the walls 74. The manner in which the guide bands 70 cooperate with the walls 74 and with the bands 66 to form an enclosure for the filler 75 is clearly apparent from FIG. 11.

Subsequent to the vacuum chambers 72 along the path of movement of the bands 66 and filler 75 are located a pair of cooling chambers 76 through which cooling liquid is circulated in the manner shown most clearly in FIG. 12. The walls 74 at this part of the construction are not preforated and the plastic bands 66 simply slide along the walls 74 at the cooling chambers 76 to become set at this time. Thus, the walls 74 extend continuously to form parts of the vacuum chambers 72 and the cooling chambers 76, and it will be noted that the guide bands 70 also extend continuously through the region where the bands 66 engage the walls 74. In fact, as is apparent from FIG. 10, the guide bands 70 are in their operative position in advance of the vacuum chambers as well as beyond the cooling chambers.

As has been pointed out above, the filler material which foams after it is introduced into the space between the bands 66 will exert a substantial pressure while it expands, and this pressure of course serves to hold the bands 66 against the walls 74. In addition, this pressure would tend to move the flexible guide bands 70 away from each other at their runs which engage the filler material 75, and in order to prevent such movement of the guide bands away from each other reinforcing strips 71 are provided. As may be seen from FIG. 11a the vacuum and cooling chambers are fixedly connected along their side walls with brackets 71a which are in turn fixed to the reinforcing strips 71 made of a rigid metal. These elements 71 engage the guide bands 70 at the inner surface of the runs thereof which contact the filler 75, and the rigid strips 71 which slidably engage the bands 70 prevent the latter from moving away from each other so that in this way an accurate rectangular cross-section for the filler is guaranteed in the case shown in the drawings where a rectangular cross-section is desired.

The filler for any of the above-described embodiments may be any suitable foam filler which will give a thermal insulation. The filler material hardens simultaneously with the plastic bands or tube. This filler material may take the form of organic or inorganic fibers such as, for example, glass fibers, which are introduced into the plastic tube or between the bands 66 with a settable binder such as polyester resin, for example. This filler material is continuously blown into the hollow space of the tube of plastic or into the space between the bands 66, and after leaving the extruder nozzle foams so as to expand and finally harden so as to form an insulating body which serves to strengthen and support the tube of plastic or the sheets of plastic.

Thus, in accordance with the invention, there is introduced into the hollow interior of the plastic tube while it is being extruded or into the space between a pair of plastic bands such as the bands 66 an insulating filler of foamable, synthetic, thermoplastic, resin-forming composition, and this may preferably be based on polyester-diisocyanate compounds. The foamable plastic which is introduced in the form of a stream into the hollow plastic tube or into the space between the plastic bands forms a large number of cells and hardens together with the plastic material of the tube. Also, the plastic filler material in most cases will become fused with the wall of the tube or with the sheets 66. A particularly suitable filler is polyurethane such as the material sold under the trade name Moloprene, these foam plastics resulting from the reaction of polyesters with diisocyanates at room temperature or at an only slightly elevated temperature with the formation of numerous cells resulting from the liberation of carbon dioxide, and with these materials it is possible to provide either a hard or a soft elastic structure according to the starting components. The liberated carbon dioxide provides an expansion pressure which increases the volume of the filler and which serves to tend to expand the tube of surrounding plastic so as to contribute to maintaining the latter against the shaping tube or so as to contribute to the maintaining of the bands 66 against the walls 74. Thus, the force resulting from the expansion of the filler material augments that resulting from the vacuum.

Moreover, a plastic polystyrene which is made to foam by means of a suitable blowing agent is also suitable for the above purposes, and this blowing agent for the polystyrene may be sodium bicarbonate or ammonium carbonate. In contrast with the polyurethane foam plastics referred to above the polystyrene foam forms closed cells.

The foam plastic may also be, for example polyvinyl chloride or other thermoplastic materials such as copolymers of vinylchloride containing a major portion of copolymerized vinylchloride, mixtures of polyvinyl chloride with other thermoplastic resins, polyvinyl butyrate, polyvinyl acetates, polyvinyl alcohol, polyvinyl acetals such as polyvinyl formal, polyvinyl butyral, etc., polyvinylidine chloride, copolymers of vinylidine chloride and vinyl chloride, polyvinyl aromatic compounds such as polystyrene, polydichlorostyrene, polyethylmethyl styrene, etc., and acrylic compounds such as polymethyl acrylate, polyethyl acrylate, polymethylmethacrylate, etc.

The blowing agent in the form of a heavy, slow-diffusing gas is capable of delaying the actual expansion until after the filler leaves the nozzle so that the expansion takes place in the manner described above in connection with FIG. 6. In addition to the examples mentioned above, an excellent blowing agent is azisobutyric dinitrile. Other nitrogen-producing blowing agents which may be used are $\alpha,\alpha'$-azobisisobutyronitrile, diazoaminobenzene, 1,3-bis(o-xenyl)-triazene, 1.3-bis(p-xenyl)triazene, etc. Nitrogen-producing blowing agents are preferred for producing the heavy, slow difusing gas which is incorporated into the thermoplastic resin mass along with the hydrogen which is introduced into the mass from without the mass. However, blowing agents which produce other gases such as ammonium or carbon dioxide may also be employed as has been mentioned above. Commonly-used blowing agents which produce these gases are sodium bicarbonate and oleic acid, ammonium carbonate, mixture of ammonium chloride and sodium nitrate, etc.

It should be noted in connection with the embodiment of FIGS. 10–12, that instead of a pair of supporting or reinforcing strips 71 which prevent the guide bands 70 from being moved away from each other at their inner runs which engage the filler, it is possible to provide a plurality of closely spaced rollers which engage the inner runs of the endless bands 70 to prevent these inner runs from being moved away from each other by the pressure of the expanding filler material.

The conveying rolls which serve to carry away the finished article produced with the process and apparatus of the invention such as the rolls 65 shown at the right end of FIG. 6 may be made of rubber.

It will be understood that each of the elements described above, or two or more together, may also find a useful application in other types of extruding process and apparatus differing from the types described above.

While the invention has been illustrated and described as embodied in tube extruding process and apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for varous applications without omitting features that, from the standpoint of prior art, fairly constitute essential characteristics of the generic or specific aspects of this invention and, therefore, such adaptations should and are intended to be comprehended within the meaning and range of equivalence of the following claims.

Having thus described my invention I claim:

1. In an extruder, in combination, an exterior die and an interior mandrel surrounded by said die and defining therewith an endless outlet through which work material flows to form a tube; an elongated tubular member coaxial with said endless outlet and located closely adjacent thereto, said tubular member having an interior larger than said outlet so that a tube of work material flowing from said outlet moves longitudinally along the interior of said tubular member, said tubular member being formed with opening means therethrough placing the interior of said tubular member in communication with the exterior thereof; means connecting a source of vacuum to the exterior of said tubular member so that the tube of work material will be sucked against the inner surface of said tubular member to have a configuration corresponding to that of the inner surface of said tubular member when said tube of work material hardens; and passage means extending through said die and mandrel and terminating in a discharge end surrounded by said outlet so that a filler material may flow through said passage means into the tube of work material issuing from said outlet to fill the tube of work material simultaneously with the movement thereof along the inner surface of said tubular member.

2. In an extruder, in combination, die means having an endless outlet passage from which a tube of work material issues and said die means having transverse passage portions extending between opposed parts of said endless passage so that partitions also flow from said die means partitioning the tubular work material issuing from said endless passage; a tubular shaping member larger than the tube of work material issuing from said die means and receiving said tube of work material, said tubular shaping member being located closely adjacent to said die means to receive the work material therefrom and said tubular shaping member being formed with an opening means providing communication between the interior and exterior of said tubular shaping member; vacuum means communicating with the exterior of said shaping member so that the work material will be sucked against the inner surface thereof to assume upon hardening a configuration corresponding to the interior of said tubular shaping member; and a plurality of passages formed in said die means and respectively communicating with the areas between said transverse passage and surrounded by said endless passage so that a filler material may issue through said plurailty of passage means into the compartments of the tubular work material to fill said compartments while the work material moves longitudinally along said tubular shaping member.

3. In an extruding process, the steps of discharging from an extruder a tube of plastic which moves along a predetermined path, said tube being at a temperature which renders said tube plastically deformable; sucking the deformable tube of plastic as it moves along said path into engagement with the inner surface of a rigid shaping tube so that the tube of plastic will conform to the configuration of said inner surface and will harden into said configuration said inner surface having a peripheral shape matching the desired final shape of said hardened tube with the peripheral shape being at least slightly greater than the peripheral shape of said heated deformable tube; and simultaneously discharging with said tube of plastic a stream of foamable, synthetic, thermoplastic, resin-forming composition surrounded by and located within said tube of plastic so that said resin-forming composition will expand within and fill said tube of plastic and will urge the tube of plastic against the inner surface of the shaping tube at least until said tube hardens.

4. A method of continuously sizing a tubular thermoplastic workpiece comprising the steps of: extruding said workpiece with external dimensions matching approximately the desired external dimensions of said workpiece, said workpiece being at a temperature which renders said workpiece plastically deformable; providing a perforated sizing sleeve having an internal surface with uniform internal dimensions corresponding to the desired finished outer dimensions of said workpiece, said internal dimensions being at least slightly greater than the peripheral shape of said deformable plastic workpiece; said perforations being arranged to inhibit striations on the surface of said workpiece; before said workpiece cools to a temperature below the temperature which allows plastic deformation of said workpiece, moving said workpiece part way through said sleeve; applying a vacuum to the outer surface of said workpiece and through said perforated sleeve to draw said workpiece into sizing relationship with the internal surface of said sleeve; and, as said workpiece moves further through said sleeve toward the exit end thereof, cooling said workpiece to a temperature that causes hardening of said thermoplastic workpiece into its desired final shape.

5. A method of continuously sizing a tubular thermoplastic workpiece comprising the steps of: extruding said workpiece with external dimensions smaller than the desired external dimensions of said workpiece; providing a perforated sizing sleeve having an internal surface with uniform internal dimensions corresponding to the desired finished outer dimensions of said workpiece, said internal dimensions being at least slightly greater than said peripheral shape of said plastic workpiece; said perforations being staggered in a circumferential direction to inhibit striations on the surface of said workpiece; before said workpiece cools to a temperature below the temperature which allows plastic deformation of said workpiece, moving said workpiece part way through said sleeve; applying a vacuum to the outer surface of said workpiece and through said perforated sleeve to draw said workpiece into sizing relationship with the internal surface of said sleeve; and, as said workpiece moves further through said sleeve toward the exit end thereof, cooling said workpiece to a temperature that causes hardening of said thermoplastic workpiece into its desired final shape.

6. A method of continuously sizing a tubular thermoplastic workpiece which has been previously heated to a temperature that will allow plastic deformation of said workpiece, said method comprising the steps of: providing a sizing sleeve having an internal surface with uniform internal dimensions corresponding to the desired finished outer dimensions of said workpiece, said internal dimensions being at least slightly greater than the peripheral shape of said deformable plastic workpiece; dividing said sleeve into a sizing zone having perforations in said internal surface and a cooling zone without perforations; said perforations being staggered in a circumferential direction to inhibit striations on the surface of said workpiece; moving said workpiece axially through said sleeve with said workpiece first passing through said sizing zone and then through said cooling zone; applying a vacuum to the outer surface of said workpiece and through the perforations of said sleeve at the sizing zone to draw said workpiece into sizing relationship with the internal surface of said sleeve; and, while said workpiece is in the cooling zone of said sleeve, cooling said workpiece to a temperature that causes hardening of said thermoplastic workpiece into its desired final shape.

7. In an apparatus of the character described, in combination, a tubular member of heat conducting material having an inner cross-sectional configuration corresponding to the outer cross-sectional configuration to be imparted to a deformable plastic, tubular workpiece, said tubular member being formed with opening means therethrough placing the interior of said tubular member in communication with the exterior thereof and said inner cross-sectional configuration of said tubular member being at least greater than the peripheral shape of said deformable plastic workpiece; extruding means for extruding a tube of a smaller cross-sectional size than the interior of said tubular member and having an extruding nozzle located immediately next to and just ahead of said tubular member to extrude the workpiece directly into said tubular member; means connecting a source of vacuum to the exterior of said tubular member; and cooling means connected to said tubular member for cooling the same, said opening means being in the form of a plurality of circumferential rows of radial apertures passing through the tubular member, the apertures of each row being staggered with respect to the apertures of the next row, so that the formation of striations on the exterior surface of the workpiece is prevented.

8. In an apparatus of the character described, in combination, a tubular member of heat conducting material having an inner cross-sectional configuration corresponding to the outer cross-sectional configuration to be imparted to a deformable plastic, tubular workpiece, said tubular member being formed with opening means therethrough placing the interior of said tubular member in communication with the exterior thereof and said inner cross-sectional configuration of said tubular member being at least greater than the peripheral shape of said deformable plastic workpiece; extruding means for extruding a tube of a smaller cross-sectional size than the interior of said tubular member and having an extruding nozzle located immediately next to and just ahead of said tubular member to extrude the workpiece directly into said tubular member; means connecting a source of vacuum to the exterior of said tubular member; and cooling means connected to said tubular member for cooling the same, said opening means being in the form of a plurality of circumferential rows of slots passing through said tubular member with the slots of each row staggered with respect to the slots of the next row to prevent the forming of striations in the exterior surface of the tubular workpiece.

9. An apparatus for sizing a tubular thermoplastic workpiece which has been previously heated to a temperature that will allow plastic deformation of said workpiece, said apparatus comprising: a sizing sleeve having an internal surface with a uniform peripheral shape and uniform internal dimensions corresponding to the desired finished outer peripheral shape and dimensions of said workpiece, a circumferential slot extending peripherally around said sleeve and having a width sufficiently small to inhibit the deformable workpiece from passing outwardly therethrough, a source of vacuum communicated with said slot, means for moving said heated workpiece axially through said sleeve, and cooling means surrounding said sleeve for cooling said workpiece below its deformable temperature before it leaves said sleeve.

10. A method of sizing an extruded tubular workpiece formed from a thermoplastic material comprising the steps of: providing a sizing sleeve with an internal sizing surface having an entrant end and an exit end with the peripheral dimensions of said entrant end being at least as large as the peripheral dimensions of said exit end, said surface having a substantially uniform cross-section substantially matching a desired outer shape of said workpiece and a narrow circumferentially extending slot in said sizing surface, moving said workpiece into and through said sleeve with said workpiece entering said sleeve while said workpiece is at a temperature which will allow plastic deformation, evacuating the air from said slot to a pressure below atmospheric pressure while simultaneously maintaining the inside of said workpiece at substantially atmospheric pressure to thereby hold said workpiece in sizing relationship with said surface and cooling said workpiece to a temperature sufficient to substantially rigidify said workpiece at said desired outer shape.

11. A method of continuously sizing a tubular thermoplastic workpiece which has been previously heated to a temperature that will allow plastic deformation of said workpiece, said method comprising the steps of: providing a perforated sizing sleeve having an internal surface with uniform internal dimensions corresponding to the desired finished outer dimensions of said workpiece; moving said workpiece axially through said sleeve; applying a vacuum to the outer surface of said workpiece and through said perforated sleeve to draw said workpiece into sizing relationship with the internal surface of said sleeve; while said workpiece is in said sleeve, cooling said workpiece to a temperature that causes hardening of said thermoplastic workpiece into its desired final shape; and, filling said workpiece with a foamable plastic material while said workpiece is moving through said sleeve.

12. An apparatus for sizing a tubular thermoplastic workpiece which has been previously heated to a temperature that will allow plastic deformation of said workpiece, said apparatus comprising: a sizing sleeve having an internal surface with a uniform peripheral shape and uniform internal dimensions corresponding to the desired finished outer peripheral shape and dimensions of said workpiece, said sleeve divided into a sizing section adjacent the entrant end thereof and a cooling section adjacent the exit end thereof, said sizing section including fluid conduit means extending through said sleeve, said conduit means extending around the periphery of the peripheral shape of said sleeve, a source of vacuum communicated to said conduit means, means for moving said heated workpiece axially through said sleeve, and cooling means for maintaining said cooling section of said sleeve at a temperature below the hardening, non-deformable temperature of said workpiece, said conduit means including a plurality of small openings having a dimension in said internal surface which substantially prevents flow of said workpiece into said openings, said openings being in the form of a plurality of circumferential rows of radially extending apertures passing through the sizing sleeve, said apertures of each row being staggered with respect to the apertures of the next row so that the formation of striations on the external surface of said moving workpiece is prevented.

13. An apparatus for sizing a tubular thermoplastic workpiece which has been previously heated to a temperature that will allow plastic deformation of said workpiece, said apparatus comprising: a sizing sleeve having an internal surface with a uniform peripheral shape and uniform internal dimensions corresponding to the desired finished outer peripheral shape and dimensions of said workpiece, said sleeve divided into a sizing section adjacent the entrant end thereof and a cooling section adjacent the exit end thereof, said sizing section including fluid conduit means extending through said sleeve, said conduit means extending around the periphery of the peripheral shape of said sleeve, a source of vacuum communicated to said conduit means, means for moving said heated workpiece axially through said sleeve, and cooling means for maintaining said cooling section of said sleeve at a temperature below the hardening, non-deformable temperature of said workpiece, said conduit means including a plurality of small openings having a dimension in said internal surface which substantially prevents flow of said workpiece into said openings, said openings being in the form of a plurality of circumferential rows of slots passing radially through said sizing sleeve with the slots of each row staggered with respect to the slots of the next row to preven formation of striations in the external surface of said moving workpiece.

14. In an apparaus for sizing a tubular thermoplastic workpiece previously heated to a plastic deformation temperature comprising a sizing member including an open-ended passage with an internal sizing surface having substantially uniform cross-sectional shape throughout its length which shape corresponds to a desired outer shape of said workpiece, said passage having an entrant end and an exit end with the peripheral dimensions of said entrant end being at least as large as the peripheral dimensions of said exit end, means for holding said heated workpiece against said sizing surface as said workpiece is moved through said passage, and means for cooling said workpiece to a substantially non-deformable condition after the sizing thereof, the improvement which comprises: said holding means including conduit means communicated with said sizing surface, said conduit means being located around the periphery of said passage between said entrant and exit ends, and means for creating a vacuum in said conduit means whereby atmospheric air pressure within said workpiece forces said workpiece against said sizing surface and holds said workpiece against said sizing surface as said workpiece moves continuously through said passage, said conduit means being a narrow slot extending around the periphery of said passage.

15. In an apparatus for sizing a tubular thermoplastic workpiece previously heated to a plastic deformation temperature comprising a sizing member including an open-ended passage with an internal sizing surface having substantially uniform cross-sectional shape throughout its length which shape corresponds to a desired outer shape of said workpiece, said passage having an entrant end and an exit end with the peripheral dimensions of said entrant end being at least as large as the peripheral dimensions of said exit end, means for holding said heated workpiece against said sizing surface as said workpiece is moved through said passage, and means for cooling said workpiece to a substantially non-deformable condition after the sizing thereof, the improvement which comprises: said holding means including conduit means communicated with said sizing surface, said conduit means being located around the periphery of said passage between said entrant and exit ends, and means for creating a vacuum in said conduit means whereby atmospheric air pressure within said workpiece forces said workpiece against said sizing surface and holds said workpiece against said sizing surface as said workpiece moves continuously through said passage, said conduit means including a plurality of small, closely spaced passages arranged around the periphery of said passage and forming a substantially continuous vacuum orifice around said periphery whereby said orifice substantially prevents striations on the surface of said workpiece.

References Cited by the Examiner

UNITED STATES PATENTS

| | | | |
|---|---|---|---|
| 1,935,076 | 11/1933 | Burns | 25—17 |
| 2,337,927 | 12/1943 | Reichel et al. | 18—14 |
| 2,519,375 | 8/1950 | Jargstorff et al. | 18—14 |
| 2,716,778 | 9/1955 | Beare | 18—13 |
| 2,790,994 | 5/1957 | Cardot et al. | 264—90 |
| 3,144,494 | 8/1964 | Gerow | 264—210 |

ROBERT F. WHITE, *Primary Examiner.*